(12) United States Patent
Mone et al.

(10) Patent No.: US 11,787,134 B2
(45) Date of Patent: Oct. 17, 2023

(54) SYSTEMS AND METHODS FOR CARBON FIBER ALIGNMENT AND FIBER-REINFORCED COMPOSITES

(71) Applicant: Boston Materials, Inc., Billerica, MA (US)

(72) Inventors: Robert Mone, Stoughton, MA (US); Anvesh Gurijala, Lancaster, MA (US)

(73) Assignee: Boston Materials, Inc., Billerica, MA (US)

( * ) Notice: Subject to any disclaimer, the term of this patent is extended or adjusted under 35 U.S.C. 154(b) by 131 days.

(21) Appl. No.: 17/293,597

(22) PCT Filed: Dec. 9, 2019

(86) PCT No.: PCT/US2019/065142
§ 371 (c)(1),
(2) Date: May 13, 2021

(87) PCT Pub. No.: WO2020/123334
PCT Pub. Date: Jun. 18, 2020

(65) Prior Publication Data
US 2022/0001631 A1    Jan. 6, 2022

Related U.S. Application Data

(60) Provisional application No. 62/777,438, filed on Dec. 10, 2018.

(51) Int. Cl.
*B29C 70/54* (2006.01)
*B29C 70/22* (2006.01)
(Continued)

(52) U.S. Cl.
CPC .......... *B29C 70/543* (2013.01); *B29C 70/228* (2013.01); *B29C 70/84* (2013.01); *B29C 70/88* (2013.01); *C08J 5/042* (2013.01)

(58) Field of Classification Search
CPC ......... C08J 5/06; C08J 5/10; C08J 5/24; C08J 2363/00; C08J 2379/08; C08J 2381/06;
(Continued)

(56) References Cited

U.S. PATENT DOCUMENTS

| 4,025,911 A | 5/1977 | Bobeck et al. |
| 4,481,249 A | 11/1984 | Ebneth et al. |

(Continued)

FOREIGN PATENT DOCUMENTS

| CN | 1784516 A | 6/2006 |
| CN | 1906234 a | 1/2007 |

(Continued)

OTHER PUBLICATIONS

Barrett, D.J., The mechanics of z-fiber reinforcement, Composite Structures, vol. 36 (1996), pp. 23-32. (Year: 1996).*

(Continued)

*Primary Examiner* — Camie S Thompson
(74) *Attorney, Agent, or Firm* — Wolf, Greenfield & Sacks, P.C.

(57) ABSTRACT

The present invention generally relates to fiber-reinforced composites, including carbon-fiber composites. These materials are useful in load-bearing components for mechanical systems, and other applications. Surprisingly, the carbon fibers can be aligned using an applied magnetic field applied directly to the carbon fibers, rather than to magnetic materials that are used to indirectly align the carbon fibers. For example, the carbon fibers may exhibit an anisotropic diamagnetic response in response to a magnetic field, which can be used to align the fibers. In some cases, the carbon fibers may be relatively pure, and/or have a relatively high modulus, which may result in diamagnetic properties. Other (Continued)

embodiments are generally directed to systems and methods for making or using such composites, kits involving such composites, or the like.

26 Claims, 2 Drawing Sheets

(51) Int. Cl.
    *B29C 70/84* (2006.01)
    *B29C 70/88* (2006.01)
    *C08J 5/04* (2006.01)

(58) Field of Classification Search
    CPC .... C08J 2479/08; C08J 2481/06; C08J 5/042; B29C 70/025; B29C 70/081; B29C 70/14; B29C 70/16; B29C 70/887; B29C 70/543; B29C 70/88; B29C 70/228; B29C 70/84; D10B 2505/02; D04H 1/74; B32B 2250/20; B32B 5/26
    USPC .......... 428/221; 442/367, 368, 261; 164/97; 264/108, 122; 257/E23.112, E23.11; 156/296
    See application file for complete search history.

(56) References Cited

U.S. PATENT DOCUMENTS

| | | |
|---|---|---|
| 4,523,628 A | 6/1985 | Vives |
| 5,432,000 A | 7/1995 | Young et al. |
| 5,876,540 A | 3/1999 | Pannell |
| 5,968,639 A | 10/1999 | Childress |
| 7,073,538 B2 | 7/2006 | Bhatnagar et al. |
| 7,409,757 B2 | 8/2008 | Hall et al. |
| 7,439,475 B2 | 10/2008 | Ohta |
| 7,537,825 B1 | 5/2009 | Wardle et al. |
| 7,655,581 B2 | 2/2010 | Goering |
| 7,803,262 B2 | 9/2010 | Haik et al. |
| 7,832,983 B2 | 11/2010 | Kruckenberg et al. |
| 7,951,464 B2 | 5/2011 | Roberts |
| 8,173,857 B1 | 5/2012 | Yananton |
| 8,197,888 B2 | 6/2012 | Sue et al. |
| 8,575,045 B1 | 11/2013 | McKnight et al. |
| 8,790,565 B2 | 7/2014 | Miller |
| 8,889,761 B2 | 11/2014 | Studart et al. |
| 9,312,046 B2 | 4/2016 | Hong et al. |
| 9,388,577 B2 | 7/2016 | Kromer et al. |
| 9,394,196 B2 | 7/2016 | Peters et al. |
| 9,732,463 B2 | 8/2017 | Carter et al. |
| 9,892,835 B2 | 2/2018 | Hong et al. |
| 9,896,783 B2 | 2/2018 | Kia |
| 11,479,656 B2 | 10/2022 | Soheilian et al. |
| 2005/0058805 A1 | 3/2005 | Kimura et al. |
| 2005/0175813 A1 | 8/2005 | Wingert et al. |
| 2005/0239948 A1 | 10/2005 | Haik et al. |
| 2006/0286361 A1 | 12/2006 | Yonetake et al. |
| 2008/0145647 A1 | 6/2008 | Ganguli et al. |
| 2009/0117269 A1 | 5/2009 | Hansen et al. |
| 2009/0227162 A1 | 9/2009 | Kruckenberg et al. |
| 2010/0040902 A1 | 2/2010 | Mizrahi |
| 2010/0196688 A1 | 8/2010 | Kritzer et al. |
| 2010/0320320 A1 | 12/2010 | Kismar et al. |
| 2011/0186775 A1 | 8/2011 | Shah et al. |
| 2012/0107599 A1 | 5/2012 | Yonetake et al. |
| 2012/0289107 A1 | 11/2012 | Beissinger et al. |
| 2013/0053471 A1 | 2/2013 | Studart et al. |
| 2013/0252497 A1 | 9/2013 | Schiebel et al. |
| 2013/0316148 A1 | 11/2013 | Gunnink |
| 2014/0250665 A1 | 9/2014 | Choi et al. |
| 2014/0342630 A1 | 11/2014 | Amtmann et al. |
| 2015/0228388 A1 | 8/2015 | Hong et al. |
| 2016/0055930 A1 | 2/2016 | Humfeld |
| 2016/0083535 A1 | 3/2016 | Wilenski et al. |
| 2016/0169009 A1 | 6/2016 | Okamoto et al. |
| 2016/0340482 A1 | 11/2016 | Williams et al. |
| 2017/0067186 A1 | 3/2017 | Kia |
| 2017/0101730 A1 | 4/2017 | Gilbertson |
| 2017/0173895 A1 | 6/2017 | Williams |
| 2017/0182700 A1 | 6/2017 | Brady |
| 2017/0338497 A1 | 11/2017 | Tatsuno et al. |
| 2018/0016420 A1 | 1/2018 | Fujimaki |
| 2018/0016740 A1 | 1/2018 | Kia et al. |
| 2019/0048500 A1 | 2/2019 | Tierney et al. |
| 2020/0024795 A1 | 1/2020 | Gurijala et al. |
| 2021/0008840 A1 | 1/2021 | Gurijala et al. |
| 2021/0009789 A1 | 1/2021 | Soheilian et al. |
| 2023/0002591 A1 | 1/2023 | Soheilian et al. |

FOREIGN PATENT DOCUMENTS

| | | |
|---|---|---|
| CN | 101224601 A | 7/2008 |
| CN | 105073848 A | 11/2015 |
| CN | 105390210 A | 3/2016 |
| CN | 105690802 A | 6/2016 |
| CN | 105734535 A | 7/2016 |
| EP | 2013408 A2 | 1/2009 |
| EP | 2085215 A1 | 8/2009 |
| EP | 3184288 A1 | 6/2017 |
| JP | 07-197311 A | 8/1995 |
| JP | 07-331358 A | 12/1995 |
| JP | 2015-063664 A | 4/2015 |
| JP | 2016-044302 A | 4/2016 |
| JP | 2016-064648 A | 4/2016 |
| WO | WO 2001/025514 A1 | 4/2001 |
| WO | WO 2005/085334 A2 | 9/2005 |
| WO | WO 2007/130979 A2 | 11/2007 |
| WO | WO 2009/009207 A2 | 1/2009 |
| WO | WO 2011/100734 A1 | 8/2011 |
| WO | WO 2018/175134 A1 | 9/2018 |
| WO | WO 2020/123334 A1 | 9/2018 |
| WO | WO 2021/007381 A1 | 1/2021 |
| WO | WO 2021/007389 A1 | 1/2021 |

OTHER PUBLICATIONS

Hashin, Analysis of the Effects of Fiber Anisotropy on the Properties of Carbon and Graphite Fiber Composites, Mechanique des solides Anisotropes, SpringerLink (1982).*
Hex Tow IM7, Carbon Fiber accessed online Feb. 6, 2023.*
Chinese Office Action for Application No. 20188003308.2 dated Jun. 29, 2021.
International Search Report and Written Opinion for Application No. PCT/US2018/021975 dated May 24, 2018.
International Preliminary Report on Patentability for Application No. PCT/US2018/021975 dated Oct. 3, 2019.
Extended European Search Report for Application No. 18770244.4 dated Dec. 3, 2020.
International Preliminary Report on Patentability dated Jun. 24, 2021 for Application No. PCT/US2019/065142.
International Search Report and Written Opinion dated Mar. 10, 2020 for Application No. PCT/US2019/065142.
Invitation to Pay Additional Fees for Application No. PCT/US2020/041306 dated Oct. 29, 2020.
International Search Report and Written Opinion for Application No. PCT/US2020/041306 dated Dec. 21, 2020.
International Search Report and Written Opinion for Application No. PCT/US2020/041322 dated Oct. 9, 2020.
[No Author Listed], Permanent Magnets vs Electromagnets. Adams Magnetic Products. Accessed Sep. 20, 2017. 5 pages.
[No Author Listed], HexTow® IM7 Carbon Fiber. HEXCEL® Product Data Sheet. Jan. 1, 2020. Retrieved from the Internet. 2 pages.
Boden et al., Nanoplatelet size to control the alignment and thermal conductivity in copper-graphite composites. Nano Lett. Jun. 11, 2014;14(6):3640-4. doi: 10.1021/nl501411g. Epub May 22, 2014.
Erb et al., Composites reinforced in three dimensions by using low magnetic fields. Science. Jan. 13, 2012;335(6065):199-204. doi: 10.1126/science.1210822.

(56) References Cited

OTHER PUBLICATIONS

Erb et al., Concentration gradients in mixed magnetic and nonmagnetic colloidal suspensions. J Appl Phys. Mar. 7, 2008;103(07A312):1-3.

Erb et al., Magnetic assembly of colloidal superstructures with multipole symmetry. Nature. Feb. 19, 2009;457(7232):999-1002. doi: 10.1038/nature07766.

Erb et al., Non-linear alignment dynamics in suspensions of platelets under rotating magnetic fields. Soft Matter. 2012;8:7604-9.

Huang, Fabrication and properties of carbon fibers. Materials. Dec. 16, 2009; 2: 2369-403. doi:10.3390/ma2042369.

Jackson et al., Out-of-plane properties. NASA, Langley Research Center Mechanics of Textile Composites Conference. Oct. 1, 1995:315-348.

Kimura et al., Uniaxial alignment of the smallest diamagnetic susceptibility axis using time-dependent magnetic fields. Langmuir. Jul. 6, 2004;20(14):5669-72. doi: 10.1021/la049347w.

Le Ferrand et al., Magnetically assisted slip casting of bioinspired heterogeneous composites. Nat Mater. Nov. 2015;14(11):1172-9. doi: 10.1038/nmat4419. Epub Sep. 21, 2015.

Libanori et al., Mechanics of platelet-reinforced composites assembled using mechanical and magnetic stimuli. ACS Appl Mater Interfaces. Nov. 13, 2013;5(21):10794-805. doi: 10.1021/am402975a. Epub Oct. 25, 2013.

Libanori et al., Ultrahigh magnetically responsive microplatelets with tunable fluorescence emission. Langmuir. Nov. 26, 2013;29(47):14674-80. doi: 10.1021/la4027305. Epub Nov. 15, 2013.

Martin et al., Designing bioinspired composite reinforcement architectures via 3D magnetic printing. Nat Commun. Oct. 23, 2015;6:8641. doi: 10.1038/ncomms9641.

Martin et al., Understanding and overcoming shear alignment of fibers during extrusion. Soft Matter. Jan. 14, 2015;11(2):400-5. doi: 10.1039/c4sm02108h.

Matthews et al., Magnetic alignment of mesophase pitch-based carbon fibers. Appl Phys Lett. Jul. 15, 1996;69(3):430-2.

Ooi et al., On the controllability of nanorod alignment in magnetic fluids. Journal of Applied Physics. Feb. 7, 2008;103(07E910):1-3.

Sander et al., High-performance battery electrodes via magnetic templating. Nature Energy. Aug. 2016;1:1-7.

Sherman et al., Fiber sizings: coupling agent companions. Composites World. Aug. 1, 2013. Retrieved from the Internet. 1 page.

Sommer et al., Injectable materials with magnetically controlled anisotropic porosity. ACS Appl Mater Interfaces. Oct. 24, 2012;4(10):5086-91. doi: 10.1021/am301500z. Epub Oct. 9, 2012.

Chinese Office Action for Application No. 2019800800347 dated Feb. 16, 2022.

Chinese Office Action for Application No. 20188003308.2 dated Jan. 24, 2022.

Chinese Office Action for Application No. 201880033308.2 dated Jul. 29, 2022.

European Office Action dated Nov. 21, 2022, for Application No. 18770244.4.

Japanese Office Action for Application No. 2020-500780 dated Feb. 15, 2022.

Japanese Office Action for Application No. 2020-500780 dated Jun. 28, 2022.

Chinese Office Action for Application No. 2019800800347 dated Jun. 28, 2022.

Extended European Search Report for Application No. 19896171.6 dated Aug. 16, 2022.

International Preliminary Report on Patentability for Application No. PCT/US2020/041306 dated Jan. 20, 2022.

International Preliminary Report on Patentability for Application No. PCT/US2020/041322 dated Jan. 20, 2022.

Matsuo, Electric, Dielectric and Magnetic Properties of Polymer and Carbon Fillers. International Workshop on Advanced Polymer Science and Turbulent Drag Reduction. Mar. 10-20, 2008. 57 pages.

Walsh et al., Carbon fibers. Composites. ASM International. 2001; 35-40.

Chinese Office Action dated Jan. 10, 2023, for Application No. CN201980080034.7.

[No Author Listed], New Practical Handbook of Hardware. Ed. Zhenwu, Z. Liaoning Science and Tech Publishing House, Jan. 2015: 1486-7.

Gardiner, Z-direction composite properties on an affordable, industrial scale. Composite World. Apr. 20, 2021. <https://www.compositesworld.com/articles/z-direction-composite-properties-on-an-affordable-industrial-scale>. 9 pages.

U.S. Appl. No. 16/495,890, filed Sep. 20, 2019, Gurijala et al.
U.S. Appl. No. 16/924,349, filed Jul. 9, 2020, Soheilian et al.
U.S. Appl. No. 17/744,553, filed May 13, 2022, Soheilian et al.
U.S. Appl. No. 16/924,381, filed Jul. 9, 2020, Gurijala et al.
U.S. Appl. No. 18/104,844, filed Feb. 2, 2023, Pan et al.

* cited by examiner

SYSTEMS AND METHODS FOR CARBON FIBER ALIGNMENT AND FIBER-REINFORCED COMPOSITES

RELATED APPLICATIONS

This application is a national stage filing under 35 U.S.C. § 371 of International Patent Application Serial No. PCT/US2019/065142, filed Dec. 9, 2019, entitled "Systems and Methods for Carbon Fiber Alignment and Fiber-Reinforced Composites," which claims the benefit of U.S. Provisional Patent Application Ser. No. 62/777,438, filed Dec. 10, 2018, entitled "Systems and Methods for Carbon Fiber Alignment and Fiber-Reinforced Composites," each of which is incorporated herein by reference in its entirety.

FIELD

The present invention generally relates to fiber-reinforced composites, including carbon-fiber composites.

BACKGROUND

Fiber-reinforced composites (e.g. carbon fiber composites) feature a generally planar assembly of reinforcing fibers (e.g. carbon fibers) that are formed into woven or non-woven textile layers. These layers provide mechanical, thermal, and electrical performance in the direction of the strong-axis of the reinforcing fibers (e.g. in-plane), but have diminished performance when loads are applied transverse to the fibers (e.g. through-thickness). Most commonly available layer materials are comprised of planar assemblies of reinforcing fibers and offer limited through-thickness reinforcement.

Typical fiber-reinforced composite structures feature several reinforcing fiber layers that are laminated and bonded together with a polymeric, ceramic, or metal matrix. While the anisotropic behavior of the reinforcing fibers provides the component with excellent in-plane properties, the lack of through-thickness reinforcement makes the laminated composite structure susceptible to interlaminar cracking, through-ply fractures, and thermal or electrical gradients. Ultimately, the lack of through-thickness reinforcement can lead to accelerated and catastrophic degradation of the laminated composite structure's integrity.

One way to improve the through-thickness properties of laminated composite structures is to magnetically align carbon fibers in the through-thickness direction. In this process, discontinuous carbon fibers are surface-coated with magnetic particles (e.g. iron oxide nanoparticles). These magnetic particle surface-coated carbon fibers exhibit a physical response to magnetic fields and are assembled into fiber-reinforced composites with through-thickness reinforcement. However, the magnetic particles may increase the cost of these materials, potentially making them impractical in certain cost-sensitive manufacturing applications. Therefore, there exists a need to develop a process in which carbon fibers could be magnetically aligned to form fiber-reinforced composites with enhanced direction-dependent properties without the use of magnetic particle surface-coatings

SUMMARY

The present invention generally relates to fiber-reinforced composites, including carbon-fiber composites. The subject matter of the present invention involves, in some cases, interrelated products, alternative solutions to a particular problem, and/or a plurality of different uses of one or more systems and/or articles.

In one aspect, the present invention is generally directed to an article. In one set of embodiments, the article comprises a composite comprising a plurality of continuous fibers defining a substrate, and a plurality of aligned carbon fibers contained within at least a portion of the substrate. In some embodiments, the plurality of carbon fibers has a carbon content greater than 94% and a modulus of at least 200 GPa. In certain cases, the composite is substantially free of paramagnetic or ferromagnetic materials.

The article, in another set of embodiments, comprises a composite comprising a plurality of continuous fibers defining a substrate, and a plurality of aligned carbon fibers contained within at least a portion of the substrate. In certain embodiments, the carbon fibers exhibit an anisotropic diamagnetic response when contained separately in water and/or ethanol, and subjected to a 100 mT magnetic field.

Another aspect of the invention is generally directed to a method. According to one set of embodiments, the method comprises exposing a liquid comprising a plurality of carbon fibers having a carbon content greater than 94% and a modulus of at least 200 GPa to a plurality of continuous fibers defining a substrate, applying a magnetic field to the liquid to cause alignment of at least some of the carbon fibers within the plurality of continuous fibers, and forming a composite comprising the aligned carbon fibers.

In another set of embodiments, the method comprises exposing a liquid comprising a plurality of carbon fibers to a plurality of continuous fibers defining a substrate, where the carbon fibers exhibit an anisotropic diamagnetic response when contained separately in ethanol and subjected to a 200 mT magnetic field, applying a magnetic field to the liquid to cause alignment of at least some of the carbon fibers within the plurality of continuous fibers, and forming a composite comprising the aligned carbon fibers.

In another aspect, the present invention encompasses methods of making one or more of the embodiments described herein, for example, a fiber-reinforced composite. In still another aspect, the present invention encompasses methods of using one or more of the embodiments described herein, for example, a fiber-reinforced composite.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
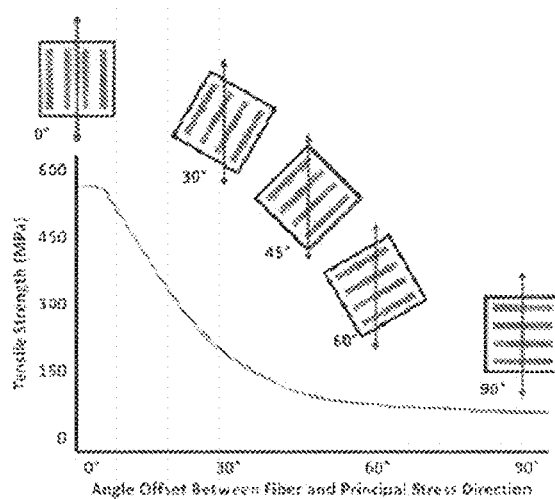
FIG. 1 illustrates a relationship between fiber orientation and the principal stress direction in carbon fibers, in accordance with one embodiment of the invention.

The present invention generally relates to fiber-reinforced composites, including carbon-fiber composites. These materials are useful in load-bearing components for mechanical systems, and other applications. Surprisingly, the carbon fibers can be aligned using an applied magnetic field applied directly to the carbon fibers, rather than to magnetic materials that are used to indirectly align the carbon fibers. For example, the carbon fibers may exhibit an anisotropic diamagnetic response in response to a magnetic field, which can be used to align the fibers. In some cases, the carbon fibers may be relatively pure, and/or have a relatively high modulus, which may result in diamagnetic properties. Other embodiments are generally directed to systems and methods for making or using such composites, kits involving such composites, or the like.

For example, certain aspects are generally directed to fiber-reinforced composite materials that features planar reinforcing fibers augmented with carbon fibers in the through-thickness direction. The through-thickness oriented carbon fibers may be captivated by sterics and optional binders. Alignment of carbon fibers transverse to the planar reinforcing fibers can eliminate interlaminar cracking, through-ply fractures, and thermal or electrical gradients. For example, the discontinuous carbon fibers may be aligned transverse to a layer of planar reinforcing fibers using low-energy magnetic fields (e.g. less than 150 mT).

One set of embodiments is generally directed to processes in which diamagnetic carbon fibers can be utilized to produce a fiber-reinforced composite that features discontinuous carbon fibers aligned transverse to a layer of planar reinforcing fibers. The use of diamagnetic carbon fibers may reduce or eliminate the need to utilize carbon fibers surface-coated with magnetic particles or the like. In some embodiments, the discontinuous carbon fibers may have greater than 94% carbon content, and/or may exhibit highly-oriented molecular structures that are sufficiently diamagnetic to orient using low-energy magnetic fields (e.g., less than 150 mT). Non-limiting examples of carbon fibers include, for instance, pitch- and/or polymer-based (e.g. ex-PAN or ex-Rayon) variants, including those commercially-available. In some cases, these may include intermediate/standard modulus (greater than 200 GPa) carbon fibers, high modulus (greater than 300 GPa), or ultra-high modulus (greater than 500 GPa) carbon fibers.

In one aspect, the present invention is directed to system and methods for using a magnetic field to align carbon fibers, such as those discussed herein. The carbon fibers may be aligned directly via magnetic field, instead of using magnetic materials that are used to indirectly align the carbon fibers. The carbon fibers may be embedded within a composite, or used in other applications.

Surprisingly, some types of carbon fibers are diamagnetic, and can be directly moved using an applied magnetic field. In contrast, most systems for aligning carbon fibers using magnetic fields use magnetic agents, such as magnetic particles, to indirectly cause the carbon fibers to align. Accordingly, it would not have been expected that carbon fibers that are substantially free of paramagnetic or ferromagnetic materials could still be aligned using an external magnetic field. For example, if any paramagnetic or ferromagnetic materials are present, they may form less than 5%, less than 1%, less than 0.5%, less than 0.3%, less than 0.1%, less than 0.05%, less than 0.03%, less than 0.01%, less than 0.005%, less than 0.003%, or less than 0.001% (by mass) of the material.

In one set of embodiments, the carbon fibers have a relatively high carbon content. Without wishing to be bound by any theory, it is believed that such fibers may exhibit diamagnetic properties that allows them to be oriented with low-energy magnetic fields. In general, diamagnetism is the repulsion of a material to an applied magnetic field by generation of an induced magnetic field that is opposite in direction to the applied magnetic field. A material is typically categorized as diamagnetic if it lacks noticeable paramagnetic or ferromagnet contributions to the overall magnetic response. In many cases, the magnetic response of diamagnetic materials is very weak and negligible. However, relatively high magnetic fields can induce a noticeable physical response in such diamagnetic materials.

Thus, in some cases, carbon fibers exhibiting relatively highly-oriented molecular structures may exhibit anisotropic, high-diamagnetism diamagnetic properties. Such diamagnetic properties may allow them to be oriented with relatively weak magnetic fields, such as is described herein. For example, in one set of embodiments, an applied magnetic field may generate a strong induced magnetic field in the C—C bonds of a carbon fiber in the opposite direction of the applied magnetic field. Certain types of carbon fibers may possess a high degree of C—C bonds parallel to the in-fiber direction, which may create an anisotropic diamagnetic response. Thus, such carbon fibers can be subjected to a magnetic torque that is neutralized when the carbon fiber aligns fully-parallel to the applied magnetic field. Accordingly, by applying a suitable magnetic field, the carbon fibers may be aligned due to such diamagnetic properties. This response may be sufficient to overcome gravitational, viscous, and/or interparticle steric effects.

For instance, in certain embodiments, the carbon fibers may have a carbon content of greater than 80%, greater than 90%, greater than 92%, greater than 94%, greater than 95%, greater than 96%, greater than 97%, greater than 98% greater than 99%, or greater than 99.5% by mass. Such carbon fibers may be obtained commercially in some cases. For example, the carbon fibers may be produced pyrolytically e.g., by "burning" or oxidizing other components that can be removed (e.g., by turning into a gas), leaving behind a carbon fiber with a relatively high carbon content. Other methods of making carbon fibers are also possible, e.g., as discussed in detail herein.

The carbon fibers may also exhibit substantial alignment of the C—C bonds within the carbon fibers in some instances. For instance, at least 50%, at least 60%, at least 70%, at least 75%, at least 80%, at least 85%, at least 90%, or at least 95% of the carbon fibers may exhibit substantial alignment of the C—C bonds. Such alignment may be determined, for example, using wide angle x-ray diffraction (WAXD), or other techniques known to those of ordinary skill in the art.

In one set of embodiments, the carbon fibers may have a relatively high modulus (tensile modulus, which is a measure of stiffness). Typically, higher modulus fibers are stiffer and lighter than low modulus fibers. Carbon fibers typically have a higher modulus when force is applied parallel to the fibers, i.e., the carbon fibers are anisotropic. In some embodiments, the carbon fibers may have a modulus (e.g., when force is applied parallel to the fibers) of at least 100 GPa, at least 200 GPa, at least 300 GPa, at least 400 GPa, at least 500 GPa, at least 600 GPa, at least 700 GPa, etc. It is believed that more flexible carbon fibers may exhibit less alignment, i.e., carbon fibers having a low modulus may have subtle physical responses to magnetic fields, or have no response, rather than align within an applied magnetic field.

In one set of embodiments, the carbon fibers may exhibit an anisotropic diamagnetic response when free-floating within a liquid (e.g., water, oil, polymer resin, polymer melt, metal melt, an alcohol such as ethanol, or another volatile organic compound), and a magnetic field is applied. For example, in some cases, the carbon fibers may align when a suitable magnetic field is applied, i.e., indicative of a diamagnetic response. In some cases, the magnetic field may be at least 100 mT, at least 200 mT, at least 300 mT, at least 500 mT, at least 750 mT, at least 1 T, at least 1.5 T, at least 2 T, at least 3 T, at least 4 T, at least 5 T, etc. In some cases, at least 30%, at least 40%, at least 50%, at least 60%, at least 70%, at least 80%, or at least 90%, of the free-floating carbon fibers within the liquid may exhibit alignment when a suitable magnetic field is applied.

Typically, a carbon fiber has a shape such that one orthogonal dimension (e.g., its length) is substantially greater than its other two orthogonal dimensions (e.g., its width or thickness). The fiber may be substantially cylindrical in some cases. As mentioned, the carbon fibers may be relatively stiff, in some instances; however, a carbon fiber need not be perfectly straight (e.g., its length may still be determined along the fiber itself, even if it is curved).

In one set of embodiments, the carbon fiber may have a dimension (e.g., a characteristic dimension) that is substantially the same, or smaller, than the thickness of the substrate. For example, at least some carbon fibers within a composite may have an average length that substantially spans the thickness of the substrate. However, in other cases, the characteristic dimension of the carbon fiber may be greater than the thickness.

As mentioned, certain embodiments of the invention are generally directed to composites comprising carbon fibers. In some cases, the carbon fibers within a composite may have an average length, or characteristic dimension, of at least 1 nm, at least 3 nm, at least 5 nm, at least 10 nm, at least 30 nm, at least 50 nm, at least 100 nm, at least 300 nm, at least 500 nm, at least 1 micrometer, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 1.5 cm, at least 2 cm, at least 3 cm, at least 5 cm, at least 10 cm, etc. In certain embodiments, the carbon fibers may have an average length, or characteristic dimension, of no more than 10 cm, no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, no more than 5 micrometers, no more than 3 micrometers, no more than 1 micrometers, no more than 500 nm, no more than 300 nm, no more than 100 nm, no more than 50 nm, no more than 30 nm, no more than 10 nm, no more than 5 nm, etc. Combinations of any of these are also possible. For example, the carbon fibers within a composite may have an average length of between 5 mm and 15 mm, or between 1 mm and 5 mm, between 1 mm and 1 cm, etc.

In addition, the carbon fibers may also have any suitable average diameter. For instance, the carbon fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the carbon fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the carbon fibers may have an average diameter of between 5 micrometers and 100 micrometers, between 10 micrometers and 100 micrometers, between 50 micrometers and 500 micrometers, between 100 micrometers and 5 mm, etc.

In certain embodiments, the carbon fibers may have a length that is at least 10 times or at least 50 times its thickness or diameter, on average. In some cases, the fibers within a composite may have an average aspect ratio (ratio of fiber length to diameter or thickness) of at least 3, at least 5, at least 10, at least 30, at least 50, at least 100, at least 300, at least 500, at least 1,000, at least 3,000, at least 5,000, at least 10,000, at least 30,000, at least 50,000, or at least 100,000. In some cases, the average aspect ratio may be less than 100,000, less than 50,000, less than 30,000, less than 10,000, less than 5,000, less than 3,000, less than 1,000, less than 500, less than 300, less than 100, less than 50, less than 30, less than 10, less than 5, etc. Combinations of any of these are also possible in some cases; for instance, the aspect ratio may be between 5, and 100,000.

In some instances, the carbon fibers may comprise a relatively large portion of the composite. For example, the carbon fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass of the composite. In some cases, the carbon fibers comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass of the composite. Combinations of any of these are also possible.

The carbon fibers, in some embodiments, may be at least substantially aligned within the composite. Methods for aligning carbon fibers are discussed in more detail herein. Various alignments are possible, and in some cases, can be determined optically or microscopically, e.g. Thus, in some cases, the alignment may be determined qualitatively. However, it should be understood that the alignment need not be perfect. In some cases, at least 5%, at least 10%, at least 25%, at least 50%, at least 75%, at least 85%, at least 90%, or at least 95% of the carbon fibers within a composite may exhibit an alignment that is within 20°, within 15°, within 10°, or within 5° of the average alignment of the plurality of the carbon fibers, e.g., within a sample of the composite.

In certain instances, the alignment of the carbon fibers is substantially orthogonal to the substrate. For example, the average alignment may be oriented to be at least 60°, at least 65°, at least 70°, at least 75°, at least 85°, or at least 87° relative to the plane of the substrate at that location. As mentioned, the substrate itself may not necessarily be planar, but may also be curved, etc.

Without wishing to be bound by any theory, it is believed that alignment of the carbon fibers substantially orthogonal to the substrate may serve to provide reinforcement of the substrate. This may improve the strength of the substrate, e.g., when subjected to forces in different directions. For instance, fibers within the substrate may run in substantially orthogonal directions in 3 dimensions, thereby providing strength to the substrate regardless of the direction of force that is applied. The carbon fibers may also limit degradation of the surface, e.g., with interlaminar micro-cracks, through-ply fissures, or the like. In addition, in some embodiments, the carbon fibers may enhance other properties of the substrate, e.g., electrical and/or thermal properties within the composite, in addition to or instead of its mechanical properties.

A variety of carbon fibers may be obtained commercially, including diamagnetic carbon fibers. In some cases, carbon fibers can be produced from polymer precursors such as polyacrylonitrile (PAN), rayon, pitch, or the like. In some cases, carbon fibers can be spun into filament yarns, e.g., using chemical or mechanical processes to initially align the polymer atoms in a way to enhance the final physical properties of the completed carbon fibers. Precursor compositions and mechanical processes used during spinning filament yarns may vary. After drawing or spinning, the polymer filament yarns can be heated to drive off non-carbon atoms (carbonization or pyrolization), to produce final carbon fiber. In some embodiments, such techniques may be used to produce carbon fiber with relatively high carbon content, e.g., at least 90%, or other contents as described herein.

At least some or all of the carbon fibers may be uncoated. In some cases, however, some or all of the carbon fibers may be coated. As non-limiting examples, the carbon fibers may be coated with a surfactant, a silane coupling agent, an epoxy, glycerine, polyurethane, an organometallic coupling agent, a polymer, a ceramic, a metal, or the like. Non-limiting examples of surfactants include oleic acid, sodium dodecyl sulfate, sodium lauryl sulfate, etc. Non-limiting examples of silane coupling agents include amino-, benzy-lamino-, chloropropyl-, disulfide-, epoxy-, epoxy/melamine-, mercapto-, methacrylate-, tertasulfido-, ureido-, vinyl-, isocynate-, and vinly-benzyl-amino-based silane coupling agents. Non-limiting examples of organometallic coupling agents include aryl- and vinyl-based organometallic coupling agents In addition, certain aspects of the invention are generally directed to composites comprising a plurality of continuous fibers defining a substrate, and a plurality of carbon fibers contained within the substrate, as noted above. For instance, at least some of the plurality of carbon fibers may be contained within holes, interstitials, or pores of the substrate, e.g., created by spacing between the continuous fibers that define the substrate. In some cases, the carbon fibers may be substantially aligned within the holes, interstitials, or pores. In some embodiments, a binder may be present, for example, to bind the continuous fibers and/or the carbon fibers within the composite.

In some cases, the composite is generally planar. However, it should be understood that such a substrate need not be a mathematically-perfect planar structure (although it can be); for instance, the substrate may also be deformable, curved, bent, folded, rolled, creased, or the like. In certain embodiments, the substrate may have an average thickness of at least about 0.1 micrometers, at least about 0.2 micrometers, at least about 0.3 micrometers, at least about 0.5 micrometers, at least about 1 micrometer, at least about 2 micrometers, at least about 3 micrometers, at least about 5 micrometers, at least about 10 micrometers, at least about 30 micrometers, at least about 50 micrometers, at least about 100 micrometers, at least about 300 micrometers, at least about 500 micrometers, at least about 1 mm, at least about 2 mm, at least about 3 mm, at least about 5 mm, at least about 1 cm, at least about 3 cm, at least about 5 cm, at least about 10 cm, at least about 30 cm, at least about 50 cm, at least about 100 cm, etc. In certain instances, the average thickness may be less than 100 cm, less than 50 cm, less than 30 cm, less than 10 cm, less than 5 cm, less than 3 cm, less than 1 cm, less than 5 mm, less than 2 mm, less than 3 mm, less than 1 mm, less than 500 micrometers, less than 300 micrometers, less than 100 micrometers, less than 50 micrometers, less than 30 micrometers, less than 10 micrometers, less than 5 micrometers, less than 3 micrometers, less than 1 micrometers, less than 0.5 micrometers, less than 0.3 micrometers, or less than 0.1 micrometers. Combinations of any of these are also possible in certain embodiments. For instance, the average thickness may be between 0.1 and 5,000 microns, between 10 and 2,000 microns, between 50 and 1,000 microns, or the like. The thickness may be uniform or non-uniform across the substrate. Also, the substrate may be rigid (e.g., as discussed herein), or may be deformable in some cases.

In some cases, the pores, interstitials, or holes that are created by the continuous fibers may be relatively small. Some or all of the pores, interstitials, or holes may contain carbon fibers, which may be aligned in some cases, e.g., as discussed herein. The pores, interstitials, or holes may have an average size or cross-sectional dimension of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc.

Composites may be used in a wide variety of applications, including those discussed in more detail herein. As non-limiting examples, composites may be used in diverse applications such as reinforcement for pressure vessels, components for wind turbines, shims used in jacking heavy structures, sporting equipment, building or construction materials, laminates or encapsulants for electronic devices, battery components, bearings, or panels for vehicles such as automobiles, aircraft, marine vehicles, or spacecraft.

As mentioned, one set of embodiments of the invention are generally directed to composites comprising substrates formed from continuous fibers, and containing a plurality of carbon fibers. The continuous fibers generally have a length that on average is substantially longer than the characteristic dimension of the carbon fibers. For instance, the continuous fibers may have an average length that is greater than 10, greater than 30, greater than 50, greater than 100, greater than 300, greater than 500, or greater than 1,000 times the characteristic dimension of the carbon fibers. In some embodiments, the continuous fibers have an average aspect ratio (e.g., of length to diameter or average cross-sectional dimension) of at least 3, at least 5, at least 10, at least 30, at least 50, at least 100, at least 300, at least 500, at least 1,000, etc. Additionally, in certain cases, the continuous fibers may have an average length of at least 1 nm, at least 3 nm, at least 5 nm, at least 10 nm, at least 30 nm, at least 50 nm, at least 100 nm, at least 300 nm, at least 500 nm, at least 1 micrometer, at least 3 micrometers, at least 5 micrometers, at least 10 micrometers, at least 30 micrometers, at least 50 micrometers, at least 100 micrometers, at least 300 micrometers, at least 500 micrometers, at least 1 mm, at least 3 mm, at least 5 mm, at least 1 cm, at least 3 cm, at least 5 cm, or at least 10 cm. Longer average lengths are also possible in some instances.

The continuous fibers may be woven together (e.g. bidirectional, multidirectional, quasi-isotropic, etc.), and/or nonwoven (e.g., unidirectional, veil, mat, etc.). In certain embodiments, at least some of the continuous fibers are substantially parallel, and/or orthogonally oriented relative to each other, although other configurations of continuous fibers are also possible. In certain embodiments, the continuous fibers may together define a fabric or other substrate, e.g., a textile, a tow, a filament, a yarn, a strand, or the like. In some cases, the substrate may have one orthogonal dimension that is substantially less than the other orthogonal dimensions (i.e., the substrate may have a thickness).

The continuous fibers forming the substrate may comprise any of a wide variety of materials, and one type or more than one type of fiber may be present within the substrate. Non-limiting examples include carbon, basalt, silicon carbide, aramid, zirconia, nylon, boron, alumina, silica, borosilicate, mullite, cotton, or any other natural or synthetic fibers.

The continuous fibers may have any suitable average diameter. For example, the continuous fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the continuous fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the continuous fibers may have an average diameter of between 5 micrometers and 100 micrometers, between 10 micrometers and 100 micrometers, between 50 micrometers and 500 micrometers, between 100 micrometers and 5 mm, etc.

The continuous fibers may also have any suitable average length. For example, the continuous fibers may have an average length of at least about 0.5 cm, at least 1 cm, at least 2 cm, at least 3 cm, at least 5 cm, at least 10 cm, etc. In certain embodiments, the continuous fibers may have an average diameter of no more than 10 cm, no more than 5 cm, no more than 3 cm, no more than 2 cm, no more than 1 cm, no more than 0.5 cm, or the like. Combinations of any of these are also possible; for example, the continuous fibers may have an average length of between 1 cm and 10 cm, between 10 cm and 100 cm, etc.

In some instances, the continuous fibers may comprise a relatively large portion of the composite. For example, in certain embodiments, the continuous fibers may comprise at least 1%, at least 2%, at least 3%, at least 4%, at least 5%, at least 7%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 97% of the mass of the composite. In some cases, the continuous fibers comprise no more than 97%, no more than 95%, no more than 90%, no more than 85%, no more than 80%, no more than 70%, no more than 60%, no more than 50%, no more than 40%, no more than 30%, no more than 20%, or no more than 10% of the mass of the composite. Combinations of any of these are also possible.

The composite may also contain one or more discontinuous agents in certain embodiments, e.g., in addition to carbon fibers. The discontinuous agents may include agglomerated agents or individual agents. The agents may have a variety of shapes, including fibers or platelets. Other shapes include, but are not limited to, nanotubes, nanofibers, nanosheets, or the like. In one set of embodiments, the discontinuous agents are not spherical. A fiber may have a shape such that one orthogonal dimension (e.g., its length) is substantially greater than its other two orthogonal dimensions (e.g., its width or thickness). A platelet may have a shape such that two orthogonal dimensions (e.g., its diameter) are substantially greater than its other orthogonal dimension (e.g., its width or thickness). A platelet may be substantially cylindrical or disc-shaped in some cases, although it may have other shapes as well. In addition, it should be understood that both platelets and fibers may be present in some cases, and/or that other shapes may be present in certain embodiments (e.g., instead of or in addition to platelets and/or fibers).

It should be understood that discontinuous agents such as platelets and/or fibers may be relatively stiff, or may be curved or flexible in some cases, or adopt a variety of other shapes. For instance, a fiber need not be perfectly straight, or a platelet need not be perfectly disc-shaped.

As mentioned, certain embodiments of the invention are generally directed to composites comprising discontinuous fibers. In some cases, the discontinuous fibers within a composite may have an average length, or characteristic dimension, of at least 1 nm, at least 3 nm, at least 5 nm, at least 10 nm, at least 30 nm, at least 50 nm, at least 100 nm, at least 300 nm, at least 500 nm, at least 1 micrometer, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 1.5 cm, at least 2 cm, at least 3 cm, at least 5 cm, at least 10 cm, etc. In certain embodiments, the discontinuous fibers may have an average length, or characteristic dimension, of no more than 10 cm, no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, no more than 5 micrometers, no more than 3 micrometers, no more than 1 micrometers, no more than 500 nm, no more than 300 nm, no more than 100 nm, no more than 50 nm, no more than 30 nm, no more than 10 nm, no more than 5 nm, etc. Combinations of any of these are also possible. For example, the discontinuous fibers within a composite may have an average length of between 5 mm and 15 mm, or between 1 mm and 5 mm, between 1 mm and 1 cm, etc.

In addition, the discontinuous fibers may also have any suitable average diameter. For instance, the discontinuous fibers may have an average diameter of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 2 cm, at least 3 cm, at least 5 cm, at least 10 cm, etc. In certain embodiments, the discontinuous fibers may have an average diameter of no more than 10 cm, no more than 5 cm, no more than 3 cm, no more than 2 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. Combinations of any of these are also possible. For example, the discontinuous fibers may have an average diameter of between 10 micrometers and 100 micrometers, between 50 micrometers and 500 micrometers, between 100 micrometers and 5 mm, etc.

In certain embodiments, the discontinuous fibers may have a length that is at least 10 times or at least 50 times its thickness or diameter, on average. In some cases, the fibers within a composite may have an average aspect ratio (ratio of fiber length to diameter or thickness) of at least 3, at least 5, at least 10, at least 30, at least 50, at least 100, at least 300, at least 500, at least 1,000, at least 3,000, at least 5,000, at least 10,000, at least 30,000, at least 50,000, or at least 100,000. In some cases, the average aspect ratio may be less than 100,000, less than 50,000, less than 30,000, less than 10,000, less than 5,000, less than 3,000, less than 1,000, less than 500, less than 300, less than 100, less than 50, less than 30, less than 10, less than 5, etc. Combinations of any of these are also possible in some cases; for instance, the aspect ratio may be between 5, and 100,000.

As mentioned, the composite is not limited to only discontinuous fibers. In certain embodiments, a composite may include platelets, e.g., instead of or in addition to discontinuous fibers. Typically, a platelet may be disc-shaped, although other shapes may be possible as well.

In some cases, the platelet may have a maximum dimension or a characteristic dimension of at least 10 micrometers, at least 20 micrometers, at least 30 micrometers, at least 50 micrometers, at least 100 micrometers, at least 200 micrometers, at least 300 micrometers, at least 500 micrometers, at least 1 mm, at least 2 mm, at least 3 mm, at least 5 mm, at least 1 cm, at least 1.5 cm, at least 2 cm, at least 3 cm, at least 5 cm, at least 10 cm, etc. In certain embodiments, the platelet have a maximum dimension or a characteristic dimension of no more than 10 cm, no more than 5 cm, no more than 3 cm, no more than 2 cm, no more than 1.5 cm, no more than 1 cm, no more than 5 mm, no more than 3 mm, no more than 2 mm, no more than 1 mm, no more than 500 micrometers, no more than 300 micrometers, no more than 200 micrometers, no more than 100 micrometers, no more than 50 micrometers, no more than 30 micrometers, no more than 20 micrometers, no more than 10 micrometers, etc. If the platelet does not have a substantially circular face (for example, if the platelet has an oblong or an irregular face), then the characteristic dimension may be taken as a diameter of a perfect circle having the same area as the face of the platelet. Combinations of any of these dimensions are also possible. For example, the maximum dimension or a characteristic dimension may be between 5 mm and 15 mm, or between 1 mm and 5 mm, between 1 mm and 1 cm, etc.

In certain embodiments, the platelet may have an average aspect ratio (ratio of largest dimension to smallest dimension or thickness) of at least 3, at least 5, at least 10, at least 30, at least 50, at least 100, at least 300, at least 500, at least 1,000, etc. In some cases, the average aspect ratio may be less than 1,000, less than 500, less than 300, less than 100, less than 50, less than 30, less than 10, less than 5, etc. Combinations of any of these are also possible in some cases; for instance, the aspect ratio may be between 5, and 1,000.

The discontinuous agents may be formed or include any of a wide variety of materials, and one or more than one type of material may be present. For example, the discontinuous agents may comprise materials such as basalt, silicon carbide, silicon nitride, aramid, zirconia, nylon, boron, alumina, silica, borosilicate, mullite, nitride, boron nitride, graphite, glass, or the like. The discontinuous agents may include any natural and/or any synthetic material, and may be magnetic and/or non-magnetic.

In certain embodiments, a binder is also present within the composite, e.g., which may be used to bind the continuous fibers and the carbon fibers (and optionally other materials). For example, the binder may facilitate holding the continuous fibers and the carbon fibers in position within the composite. However, it should be understood that the binder is optional and not required in all cases. In some cases, the binder may comprise a resin. The binder may include a thermoset or a thermoplastic. In certain embodiments, the binder may comprise a thermoplastic solution, a thermoplastic melt, thermoplastic pellets, thermoplastic powders, thermoplastic films, a thermoset resin, a volatile compound such as a volatile organic compound, water, or an oil. Additional non-limiting examples of binders include an epoxy, polyester, vinyl ester, polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, a silicone rubber, polyvinylidene fluoride, polytetrafluoroethylene, perfluoroalkoxy alkanes, styrene butadiene rubber, or a pre-ceramic monomer, such as a siloxane, a silazane, or a carbosilane. The binder may also include mixtures including any one or more of these materials and/or other materials, in certain embodiments.

In some embodiments, the binder may comprise at least 1%, at least 2%, at least 3%, at least 4%, at least 5%, at least 7%, at least 10%, at least 15%, at least 20%, or at least 25% of the mass of the composite, and/or no more than 25%, no more than 20%, no more than 15%, no more than 10%, no more than 7%, no more than 5%, no more than 4%, no more than 3%, no more than 2%, or no more than 1% of the mass of the composite.

Another aspect of the present invention is generally directed to systems and methods for making composites such as those described herein. In one set of embodiments, composites can be prepared from a liquid, such as a slurry, containing a plurality of carbon fibers, to which a suitable substrate is exposed to. A magnetic field can be applied to manipulate the carbon fibers, e.g., when such carbon fibers exhibit an anisotropic diamagnetic response in response to the magnetic field. Excess material can be removed. In some cases, the composite can be set or hardened, e.g., with a binder, which may be used to immobilize or fix the carbon fibers within the substrate. The binder may, in certain embodiments, be infused or impregnated into the substrate.

In some cases, a liquid, such as a slurry, may be formed. The slurry may include carbon fibers. The liquid phase may include, for example, a thermoplastic or a thermoset, e.g., a thermoplastic solution, thermoplastic melt, thermoplastic pellet, thermoplastic powder, thermoset resin, thermoset emulsion, thermoset powder, volatile organic compound, water, or oil. Non-limiting examples of thermoplastics include polyethylenimine, polyetherketoneketone, polyaryletherketone, polyether ether ketone, polyphenylene sulfide, polyethylene terephthalate, a polycarbonates, poly(methyl methacrylate), acrylonitrile butadiene styrene, polyacrylonitrile, polypropylene, polyethylene, nylon, polyvinylidene fluoride, phenolics, epoxies, bismaleimides, cyanate esters, polyimides, etc. Non-limiting examples of elastomers include silicone rubber and styrene butadiene rubber, etc. Non-limiting examples of thermosets include epoxy, polyester, vinyl ester, etc. Non-limiting examples of pre-ceramic monomers include a siloxane, a silazane, or a carbosilane, etc. In some cases, for example, one or more of these may be added to assist in homogenously dispersing the carbon fibers within the liquid. Examples of volatile organic compounds include, but are not limited to, water, isopropanol, butanol, ethanol, acetone, toluene, or xylenes. Particles may also be present within the slurry in some cases, e.g., polymer particles, ceramic particles, metal particles, etc.

Any suitable amount of carbon fiber may be present in the slurry or other liquid. For instance, at least 10%, at least 15%, at least 20%, at least 25%, at least 30%, at least 35%, at least 40%, at least 45%, at least 50%, at least 55%, at least 60%, at least 65%, at least 70%, at least 75%, or at least 80% of the volume of the slurry may be carbon fibers. In some cases, no more than 85%, no more than 80%, no more than 75%, no more than 70%, no more than 65%, no more than 60%, no more than 55%, no more than 50%, no more than 45%, no more than 40%, no more than 35%, no more than 30%, no more than 25%, no more than 20%, no more than 15%, or no more than 10% may be carbon fibers. Combinations of any of these are also possible in some cases. For example, a slurry or other liquid may contain between 70% and 80%, between 75% and 85%, between 50% and 90%, etc. carbon fibers.

After preparation of the slurry or other liquid, it may be applied to or exposed to the substrate, e.g., comprising the continuous fibers. In some cases, the substrate may be placed on a surface such as a polymer foil, metal foil, or paper, e.g., for application of liquid, a magnetic field, mechanical vibration, heating, and/or the like, e.g., as discussed herein.

Any suitable method may be used to apply the slurry or other liquid to the substrate. As non-limiting examples, the liquid may be poured, coated, sprayed, or painted onto the substrate, or the substrate may be immersed partially or completely within the liquid. The liquid may be used to wet, coat, and/or surround the continuous fibers.

A magnetic field may be applied to manipulate the carbon fibers, e.g., via an anisotropic diamagnetic response. For instance, the magnetic field may be used to move the carbon fibers into the substrate, e.g., into pores, interstitials, or holes within the substrate. In addition, in some cases, the magnetic field may be used to at least substantially align the carbon fibers within the substrate, e.g., as discussed herein. For example, the magnetic field may be used to align at least 50%, at least 75%, at least 85%, at least 90%, or at least 95% of the carbon fibers to within 20°, within 15°, within 10°, or within 5° of the average alignment. The magnetic field, in some embodiments, may be used to align the carbon fibers within the substrate, e.g., in the direction of the magnetic field, and/or within the substrate in a through-plane direction.

Any suitable magnetic field may be applied. In some cases, the magnetic field is a constant magnetic field. In other cases, the magnetic field may be time-varying; for example, the magnetic field may oscillate or periodically change in amplitude and/or direction, e.g., to facilitate manipulation of the carbon fibers. The oscillation may be sinusoidal or another repeating waveform (e.g., square wave or sawtooth). The frequency may be, for example, at least 0.1 Hz, at least 0.3 Hz, at least 0.5 Hz, at least 1 Hz, at least 3 Hz, at least 5 Hz, at least 10 Hz, at least 30 Hz, at least 50 Hz, at least 100 Hz, at least 300 Hz, at least 500 Hz, etc., and/or no more than 1000 Hz, no more than 500 Hz, no more than 300 Hz, no more than 100 Hz, no more than 50 Hz, no more than 30 Hz, no more than 10 Hz, no more than 5 Hz, no more than 3 Hz, etc. For example, the frequency may be between 1 Hz to 500 Hz, between 10 Hz and 30 Hz, between 50 Hz and Hz, or the like. In addition, the frequency may be held substantially constant, or the frequency may vary in some cases.

The magnetic field, whether constant or oscillating, may have any suitable amplitude. For example, the amplitude may be at least 0.001 T, at least 0.003 T, at least 0.005 T, at least 0.01 T, at least 0.03 T, at least 0.05 T, at least 0.1 T, at least 0.3 T, at least 0.5 T, at least 1 T, at least 3 T, at least 5 T, at least 10 T, etc. The amplitude in some cases may be no more than 20 T, no more than 10 T, no more than 5 T, no more than 3 T, no more than 1 T, no more than 0.5 T, no more than 0.3 T, no more than 0.1 T, no more than 0.05 T, no more than 0.03 T, no more than 0.01 T, no more than 0.005 T, no more than 0.003 T, etc. The amplitude may also fall within any combination of these values. For instance, the amplitude may be between 0.01 T to 10 T, between 1 T and 3 T, between 0.5 T and 1 T, or the like. The amplitude may be substantially constant, or may vary in certain embodiments, e.g., within any range of these values.

In some embodiments, the magnetic field direction (i.e., direction of maximum amplitude) may vary by +/−90°, +/−85°, +/−80°, +/−75°, +/−70°, +/−65°, +/−60°, +/−55°, +/−50°, +/−45°, +/−40°, +/−35°, +/−30°, +/−25°, +/−20°, +/−15°, +/−10°, +/−5° about a mean direction.

A variety of different devices for producing suitable magnetic fields may be obtained commercially, and include permanent magnets or electromagnets. In some cases, an oscillating magnetic may be created by attaching a magnet to a rotating disc and rotating the disc at an appropriate speed or frequency. Non-limiting examples of permanent magnets include iron magnets, alnico magnets, rare earth magnets, or the like.

In addition, in one set of embodiments, mechanical vibration may be used to manipulate the particles, e.g., in addition to and/or instead of magnetic manipulation. For example, mechanical vibration can be used to move particles into the substrate, e.g., into pores, interstitials, or holes within the substrate, and/or at least substantially align the carbon fibers within the substrate, e.g., as discussed herein. In some cases, vibration may be used to align the carbon fibers within the substrate and/or move the carbon fibers into holes, interstitials, or pores within the substrate.

In one set of embodiments, mechanical vibration may be applied to cause motion of the carbon fibers of at least 1 micrometer, at least 2 micrometers, at least 3 micrometers, at least 5 micrometers, at least 10 micrometers, at least 20 micrometers, at least 30 micrometers, at least 50 micrometers, at least 100 micrometers, at least 200 micrometers, at least 300 micrometers, at least 500 micrometers, at least 1,000 micrometers, at least 2,000 micrometers, at least 3,000 micrometers, at least 5,000 micrometers, or at least 10,000 micrometers.

In addition, in some cases, the mechanical vibrations may be time-varying; for example, the mechanical vibrations may periodically change in amplitude and/or direction, e.g., to facilitate manipulation of the carbon fibers. The oscillation may be sinusoidal or another repeating waveform (e.g., square wave or sawtooth). The frequency may be, for example, at least 0.1 Hz, at least 0.3 Hz, at least 0.5 Hz, at least 1 Hz, at least 3 Hz, at least 5 Hz, at least 10 Hz, at least 30 Hz, at least 50 Hz, at least 100 Hz, at least 300 Hz, at least 500 Hz, etc., and/or no more than 1000 Hz, no more than 500 Hz, no more than 300 Hz, no more than 100 Hz, no more than 50 Hz, no more than 30 Hz, no more than 10 Hz, no more than 5 Hz, no more than 3 Hz, etc. For example, the frequency may be between 1 Hz to 500 Hz, between 10 Hz and 30 Hz, between 50 Hz and Hz, or the like. In addition, the frequency may be held substantially constant, or the frequency may vary in some cases. If applied in conjunction with an oscillating magnetic field, their frequencies may independently be the same or different.

During and/or after alignment, the carbon fibers within the substrate may be set or fixed in some embodiments, e.g., to prevent or limit subsequent movement of the carbon fibers and form a relatively hard composite. Non-limiting examples of techniques to form the composite include, but are not limited to solidifying, hardening, gelling, melting, evaporating, freezing, or lyophilizing the liquid or the slurry. In another set of embodiments, a material, such as a thermosetting polymer, may be cured to harden the composite. The substrate may thus form a composite that is a solid, a gel, or the like.

In some cases, the liquid may comprise a relatively volatile solvent, which can be removed by heating and/or evaporation (e.g., by waiting a suitable amount of time, or allowing the solvent to evaporate, e.g., in a fume hood or other ventilated area). Non-limiting examples of volatile solvents include isopropanol, butanol, ethanol, acetone, toluene, or xylenes. Other examples of methods of removing solvents include applying vacuum, lyophilization, mechanical shaking, or the like.

In one set of embodiments, heating may be applied to the substrate, for example, to remove a portion of the solvent. For example, the substrate may be heated to a temperature of at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 90° C., at least about 100° C., at least about 125° C., at least about 150° C., at least about 175° C., at least about 200° C., at least about 250° C., at least about 300° C., at least about 350° C., at least about 400° C., at least about 450° C., at least about 500° C., etc. Any suitable method of applying heat may be used, for example, a thermoelectric transducer, an Ohmic heater, a Peltier device, a combustion heater, or the like. In some cases, the viscosity of the liquid may decrease as a result of heating. The heating may be applied, for example, prior, concurrent or subsequent to the application of magnetic field and/or mechanical vibration. In some cases, heating may be used to prevent or initiate cross-linking or curing of a thermosetting prepolymer.

A binder may also be applied in one set of embodiments, e.g., before, during, and/or after hardening of the composite and/or removal of at least a portion of the liquid. In some embodiments, the binder may be used to produce a preimpregnated composite ply material, e.g., by wetting dry ply material. The binder may be a liquid in some cases, and may be caused to harden after application to the composite. In some cases, the binder is permeated into at least a portion of the composite. Non-limiting examples of permeation techniques include using gravitational and capillary forces, by applying pressure to the binder to force it into the composite, or the like. Other examples include, but are not limited to, hot-pressing, calendaring, or vacuum infusion. However, in some cases, the binder is used to coat all, or only a portion of, the substrate, e.g., without necessarily requiring permeation. Non-limiting examples of suitable binders include resins or other materials such as those discussed herein.

After permeation, the binder may be hardened. In some cases, the binder may harden spontaneously, e.g., upon evaporation of a solvent. In certain embodiments, heat may be applied to harden the binder, e.g., by exposing the composite to temperatures such as those described above. In some embodiments, the binder may be hardened upon exposure to light or a catalyst, e.g., to facilitate or promote a chemical or polymerization reaction to cause the binder to polymerize. For example, a thermosetting polymer may be cured upon exposure to suitable temperatures. In another example, a polymer may be exposed to ultraviolet light to cause polymerization to occur.

Composites such as those discussed herein may be used in a wide variety of applications, in various aspects. Composites such as those described herein may exhibit a variety of different features in various embodiments of the invention. For example, composites such as those discussed herein may be useful for reducing or eliminating stress concentrations, reducing or eliminating delamination, increasing planar strength and/or stiffness, reducing or eliminating surface wear, dissipating electricity (e.g., in electrical shocks), transmitting electrical signals, attenuating electromagnetic waves, transmitting electromagnetic waves, dissipating heat (e.g., in thermal shocks), reducing or eliminating thermal gradients, storing energy, synthesizing ex-PAN carbon fibers, synthesizing ceramic matrix composites (CMC), or the like.

For example, in one set of embodiments, a composite ply with at least three-axes of fiber orientation may be produced. This fiber structure may allow the composite ply to distribute stresses between subsequent plies and adjacent components, which may reduce or eliminate stress concentrations. This may significantly improve the strength of a laminated composite structure under dynamic loads, e.g., when a laminated composite structure is formed with small features or mates with a material with drastically different stiffness (e.g. metal alloys or plastics).

Another set of embodiments is generally directed to a composite ply with through-plane reinforcement of the interlaminar region. This fiber reinforcement allows the composite ply to efficiently distribute stresses between adjacent layers to hinder the formation of cracks and prevents a crack from propagating in the interlaminar region. The targeted reinforcement of the interlaminar region can significantly improve the strength of a laminated composite structure under shock and cyclic loads. This formulation may be useful when a laminated composite structure is formed with long sheets of composite ply, for example, where a single crack in the interlaminar region between the plies can potentially compromise the structural integrity of the overall structure.

Yet another set of embodiments is generally directed to a composite ply with through-plane reinforcement, e.g., a through-plane uni-directional fabric. This fiber reinforcement may reinforce target through-plane loads (e.g. point loads and high-pressure loads). The targeted through-plane reinforcement can significantly improve the strength and stiffness of a laminated composite structure under expected through-plane mechanical loads. This may be useful for effectively handling a composite ply with through-plane reinforcement that can easily deform during handling in an un-cured state while forming an exterior shell for a laminated composite structure.

Still another set of embodiments is generally directed to a composite ply with through-plane oriented carbon fibers. In some cases, the through-plane reinforcement can significantly improve the polymer matrix's resistance to damage from mechanical wear (e.g. abrasion) and/or chemical corrosion (e.g. oxidization). This formulation may be useful, for example, for forming surfaces that protect structures from mechanical and chemical wear.

In one set of embodiments, a composite ply is provided having enhanced through-plane electrical conductivity. This can significantly improve the resistance to damage caused by localized heat generation induced by charge accumulation upon rapid discharge of electrical energy (e.g. lightning). This formulation is particularly useful for forming surfaces that protect structures from damage from electrical discharge. In another set of embodiments, a composite ply with enhanced near-isotropic electrical conductivity is provided. This may effectively conduct electrical signals. In yet another set of embodiments, a composite ply is provided with enhanced isotropic electrical conductivity. This material may effectively attenuate incident electromagnetic waves. In still another set of embodiments, a composite ply is provide having low radio-frequency interference and enhanced through-plane thermal conductivity to effectively transmit electromagnetic waves without overheating.

Another set of embodiments is generally directed to a composite ply with enhanced through-plane thermal conductivity for sufficient structural integrity under heating. This may be useful in some embodiments for increasing structural integrity under rapid temperature fluctuations. Still another set of embodiments is generally directed to a composite ply with through-plane thermal conductivity and low electrical conductivity. This formulation may be useful for effectively moving and distributing heat flux, e.g., in electronics.

Yet another set of embodiments is generally directed to a carbon-based composite ply with through-plane electrical conductivity. This may be useful for adsorbing ionic species from an electrolyte and efficiently distributing electrical charge.

One set of embodiments is generally directed to a composite ply with through-plane carbon fiber catalysts. At appropriate temperatures, a PAN (polyacrylonitrile) matrix may be oxidized and carbonized to form a carbon matrix. Another set of embodiments is generally directed to a composite ply with through-plane carbon fiber or silicon carbide catalysts. At appropriate temperatures, the polymer matrix may be oxidized to form a ceramic matrix.

Int. Pat. Apl. Pub. No. WO 2018/175134, entitled "Fiber-Reinforced Composites, Methods Therefor and Articles Comprising the Same," is incorporated herein by reference in its entirety. In addition, U.S. Provisional Patent Application Ser. No. 62/777,438, filed Dec. 10, 2018, entitled "Systems and Methods for Carbon Fiber Alignment and Fiber-Reinforced Composites," is incorporated herein by reference in its entirety.

The following examples are intended to illustrate certain embodiments of the present invention, but do not exemplify the full scope of the invention.

Example 1

This example shows that discontinuous reinforcing fibers can exhibit remarkable strength and modulus when they are oriented in the direction of the loading. Additionally, discontinuous fibers may offer cost savings compared to their continuous counterparts of lesser or equal strength. However, orientation is important as the tensile performance of both discontinuous and continuous fibers drastically degrades as they approach tangent to the stress. See FIG. 1, schematically showing a relationship between fiber orientation and principal stress direction in carbon fibers.

Figure 2:
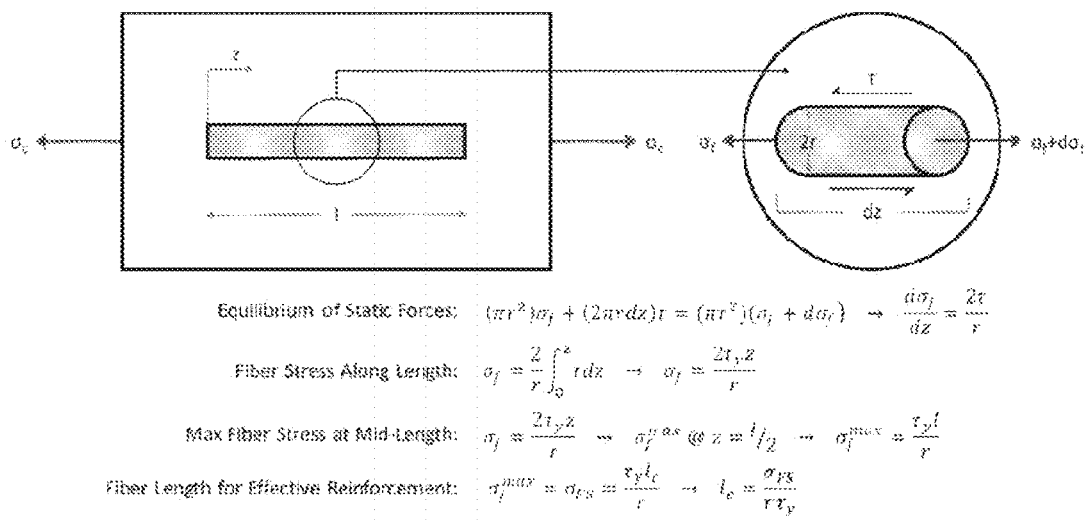
FIG. 2 illustrates shear-lag theory, in accordance with certain embodiments of the invention.

Proper orientation of fibers in the direction of the loading may be used to ensure efficient load transferal from the matrix to the reinforcing fiber. An applied load on the composite may be distributed between the matrix and fiber reinforcements. Strain difference between the matrix and reinforcement fibers can result in shear stresses at their interface. This shearing mechanism facilitates tensile load transferal between the matrix and fiber. In addition, part of the load is axially transferred to the reinforcing fiber. The interplay between shear (t, tau) and axial (or, sigma-f) load transfer may be modeled, for example, as is shown in FIG. 2.

Figure 3:
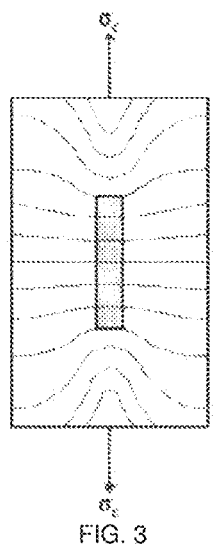
FIG. 3 illustrates load transfer dominated by shear stresses, in another embodiment.

Per shear-lag theory, for most laminated composite structures, a length between 5 mm and 15 mm may be suitable when using carbon and glass fiber reinforcements. At these size scales, the orientation of individual fibers during manufacturing may be dominated by viscous and shear forces, thus requiring the use of pre-made woven or non-woven continuous fiber materials to tune directional reinforcement. In most composites, reinforcing fibers are immersed in a bulk polymer matrix; load is transferred to the reinforcing fibers primarily through the polymer matrix, resulting in load transfer dominated by shear stresses. See FIG. 3, showing the distribution of stress at the interface of fiber and matrix in a thick composite.

Figure 4:
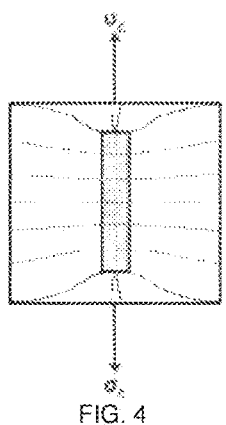
FIG. 4 shows that discontinuous fibers may have high modulus and may not undergo significant strain under loadings, minimizing the effect of shearing load transfer, according to certain embodiments of the invention.

In a composite with thickness on the same order of magnitude as the length of an aligned discontinuous fiber, the axial load transfer is increased. Discontinuous fibers often have high modulus and may not undergo significant strain under loadings, minimizing the effect of shearing load transfer (see FIG. 4). This redistributed load transfer mechanism allowed by aligning discontinuous fibers in a composite film can allow higher-efficiency load transfer and circumvents critical fiber length limitations associated with conventional fiber reinforced composites. The degree of alignment (e.g. from randomly oriented to exceedingly oriented) of the discontinuous fibers in the polymer matrix can be tuned to balance between axial and shear load transfer. This is shown in FIG. 4 with the distribution of stress at the interface of fiber and matrix in a thin composite Increased load transfer efficiency implies that through-plane oriented discontinuous fibers in a composite film will remain strongly locked within the surrounding matrix; increasing the composite's strength and toughness under through-plane loading and resistance to wear and cracking. Similarly, anisotropic materials, including fibers of carbon, glass, basalt, boron, or aramid and micro-platelets of alumina, boron nitride, and graphite, can similarly exploit through-plane alignment to achieve greatly enhanced through-plane thermal and electrical properties, which may be useful for providing electromagnetic wave transmission/attenuation and effective heat distribution/isolation.

Example 2

Figures 5A, 5B:
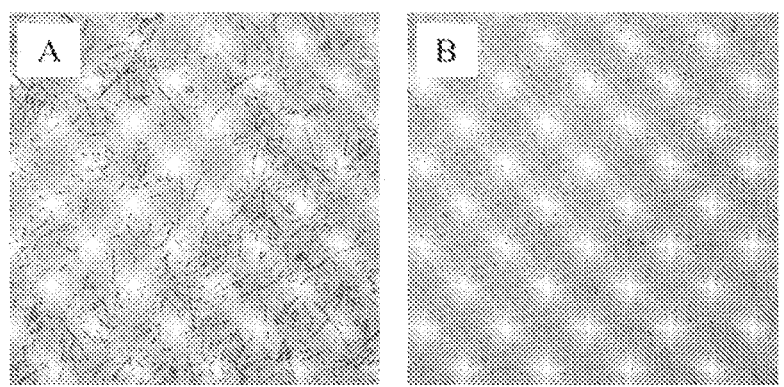
FIGS. 5A-5B illustrate aligned fibers, in one embodiment of the invention.

In this example, milled PAN-based carbon fibers (150 micron length) were randomly distributed in water and observed under a microscope. This is shown in FIG. 5A.

The same sample was agitated and placed under a permanent rare earth magnet that had a surface magnetic field ranging from 0.1 T to 0.3 T in strength. The milled carbon fibers were observed to become vertically aligned under the applied magnetic field. To clarify, these milled carbon fibers did not contain any surface coatings. While the sample exposed to the magnetic field, it was observed under a microscope. An image of the milled carbon fibers vertically aligned in the water is shown in FIG. 5B, showing that some alignment had occurred.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
a composite comprising a plurality of continuous fibers defining a substrate, and a plurality of aligned carbon fibers contained within at least a portion of the substrate, wherein the plurality of carbon fibers has a carbon content greater than 94%, a modulus of at least 200 GPa, and wherein the composite is substantially free of paramagnetic or ferromagnetic materials.

2. The article of claim 1, wherein the carbon fibers exhibit an anisotropic diamagnetic response when contained separately in ethanol and subjected to a 100 mT magnetic field.

3. The article of claim 1, wherein the plurality of aligned carbon fibers are contained within and positioned substantially orthogonal to the substrate.

4. The article of claim 1, wherein at least 5% (by number) of the plurality of aligned carbon fibers are aligned.

5. The article of claim 1, wherein the plurality of aligned carbon fibers have substantially oriented C—C bonds forming the carbon fibers.

6. The article of claim 1, wherein the plurality of aligned carbon fibers have an average length of less than 5 mm.

7. The article of claim 1, wherein the plurality of aligned carbon fibers comprises no more than 97% by mass of the composite.

8. The article of claim 1, wherein the plurality of aligned carbon fibers have an average aspect ratio of length to diameter that is at least 5.

9. The article of claim 1, wherein at least some of the plurality of continuous fibers are substantially parallel.

10. The article of claim 1, wherein the plurality of continuous fibers have an average length of at least 5 millimeters.

11. An article, comprising:
a composite comprising a plurality of continuous fibers defining a substrate, and a plurality of aligned carbon fibers contained within at least a portion of the substrate, wherein the plurality of carbon fibers has a carbon content greater than 94%, a modulus of at least 200 GPa, and comprises at least 3% by mass of the composite, and wherein the composite is substantially free of paramagnetic or ferromagnetic materials.

12. The article of claim 11, wherein the plurality of aligned carbon fibers are contained within and positioned substantially orthogonal to the substrate.

13. The article of claim 11, wherein at least some of the plurality of continuous fibers are substantially parallel.

14. The article of claim 11, wherein the plurality of continuous fibers have an average length of at least 5 millimeters.

15. An article, comprising:
a composite comprising a plurality of continuous fibers defining a substrate, and a plurality of aligned carbon fibers contained within at least a portion of the substrate, wherein the plurality of carbon fibers has a carbon content greater than 94% and a modulus of at least 200 GPa, wherein the composite is substantially free of paramagnetic or ferromagnetic materials, and wherein at least some of the plurality of aligned carbon fibers have an average length that substantially spans the thickness of the substrate.

16. The article of claim 15, wherein the plurality of aligned carbon fibers are contained within and positioned substantially orthogonal to the substrate.

17. The article of claim 15, wherein at least some of the plurality of continuous fibers are substantially parallel.

18. The article of claim 15, wherein the plurality of continuous fibers have an average length of at least 5 millimeters.

19. An article, comprising:
a composite comprising a plurality of continuous fibers defining a substrate, and a plurality of aligned carbon fibers contained within at least a portion of the substrate, wherein the plurality of carbon fibers has a carbon content greater than 94% and a modulus of at least 200 GPa, wherein the composite is substantially free of paramagnetic or ferromagnetic materials, and wherein the substrate has an average thickness of less than 10 cm.

20. The article of claim 19, wherein the composite further comprises a binder binding the plurality of continuous fibers and the plurality of aligned carbon fibers.

21. The article of claim 20, wherein the binder comprises a resin.

22. The article of claim 20, wherein the binder comprises a thermoplastic solution, melt, pellet, powder, and/or resin.

23. The article of claim 20, wherein the binder comprises a thermoplastic, thermoset, and/or oil.

24. The article of claim 19, wherein the plurality of aligned carbon fibers are contained within and positioned substantially orthogonal to the substrate.

25. The article of claim 19, wherein at least some of the plurality of continuous fibers are substantially parallel.

26. The article of claim 19, wherein the plurality of continuous fibers have an average length of at least 5 millimeters.

* * * * *